United States Patent
Rueter et al.

(10) Patent No.: US 7,144,565 B2
(45) Date of Patent: Dec. 5, 2006

(54) PROCESS FOR DIRECT CATALYTIC HYDROGEN PEROXIDE PRODUCTION

(75) Inventors: Michael Rueter, Plymouth Meeting, PA (US); Bing Zhou, Cranbury, NJ (US); Sukesh Parasher, Lawrenceville, NJ (US)

(73) Assignee: Headwaters Nanokinetix, Inc., Lawrenceville, NJ (US)

( * ) Notice: Subject to any disclaimer, the term of this patent is extended or adjusted under 35 U.S.C. 154(b) by 10 days.

(21) Appl. No.: 10/897,493

(22) Filed: Jul. 23, 2004

(65) Prior Publication Data

US 2005/0025697 A1 Feb. 3, 2005

Related U.S. Application Data

(60) Provisional application No. 60/491,144, filed on Jul. 29, 2003.

(51) Int. Cl.
C01B 15/029 (2006.01)
(52) U.S. Cl. ..................................................... 423/584
(58) Field of Classification Search ................ 423/584
See application file for complete search history.

(56) References Cited

U.S. PATENT DOCUMENTS

| | | |
|---|---|---|
| 4,007,256 A | 2/1977 | Kim et al. |
| 4,009,252 A | 2/1977 | Izumi et al. |
| 4,028,274 A | 6/1977 | Kunz |
| 4,064,154 A | 12/1977 | Chadra et al. |
| 4,083,803 A | 4/1978 | Oswald et al. |
| 4,128,627 A | 12/1978 | Dyer et al. |
| 4,148,750 A | 4/1979 | Pine |
| 4,279,883 A | 7/1981 | Izumi et al. |
| 4,313,806 A | 2/1982 | Dalton, Jr. et al. |
| 4,335,092 A | 6/1982 | Dalton et al. |
| 4,336,238 A | 6/1982 | Dalton, Jr. et al. |
| 4,336,239 A | 6/1982 | Dalton et al. |
| 4,336,240 A | 6/1982 | Moselay et al. |
| 4,347,231 A | 8/1982 | Michaelson |
| 4,347,232 A | 8/1982 | Michaelson |
| 4,366,085 A | 12/1982 | Ikegami et al. |
| 4,369,128 A | 1/1983 | Moseley et al. |
| 4,379,778 A | 4/1983 | Dalton, Jr. et al. |
| 4,476,242 A | 10/1984 | Puskas et al. |
| 4,503,160 A | 3/1985 | Williams |
| 4,513,098 A | 4/1985 | Tsao |
| 4,661,337 A | 4/1987 | Brill |
| 4,681,751 A | 7/1987 | Gosser |
| 4,701,428 A | 10/1987 | Bellussi et al. |
| 4,713,363 A | 12/1987 | Hucul |
| 4,772,458 A | 9/1988 | Gosser et al. |
| 4,824,976 A | 4/1989 | Clerici et al. |
| 4,826,795 A | 5/1989 | Kitson et al. |
| 4,832,938 A | 5/1989 | Gosser et al. |
| 4,889,705 A | 12/1989 | Gosser |
| 4,937,216 A | 6/1990 | Clerici et al. |
| 4,937,220 A | 6/1990 | Nickols, Jr. |
| 4,983,558 A | 1/1991 | Born et al. |
| 4,996,039 A | 2/1991 | Pralus et al. |
| 5,017,535 A | 5/1991 | Schoonhoven et al. |
| 5,024,905 A | 6/1991 | Itoh et al. |
| 5,061,671 A | 10/1991 | Kitson et al. |
| 5,082,647 A | 1/1992 | Chuang |
| 5,096,866 A | 3/1992 | Itoh et al. |
| 5,104,635 A | 4/1992 | Kanada et al. |
| 5,128,114 A | 7/1992 | Schwartz |
| 5,132,099 A | 7/1992 | Hiramatsu et al. |
| 5,135,731 A | 8/1992 | Gosser et al. |
| 5,166,372 A | 11/1992 | Crocco et al. |
| 5,169,618 A | 12/1992 | Maraschino |
| 5,180,573 A | 1/1993 | Hiramatsu et al. |
| 5,214,168 A | 5/1993 | Zajacek et al. |
| 5,234,584 A | 8/1993 | Birbara et al. |
| 5,236,692 A | 8/1993 | Nagashima et al. |
| 5,320,821 A | 6/1994 | Nagashima et al. |
| 5,338,531 A | 8/1994 | Chuang et al. |
| 5,352,645 A | 10/1994 | Schwartz |
| 5,362,405 A | 11/1994 | Birbara |
| 5,372,981 A | 12/1994 | Witherspoon |
| 5,378,450 A | 1/1995 | Tomita et al. |
| 5,391,531 A | 2/1995 | Ward |
| 5,399,344 A | 3/1995 | Yang et al. |
| 5,447,706 A | 9/1995 | Van Weynbergh et al. |
| 5,460,734 A | 10/1995 | Birbara et al. |
| 5,480,629 A | 1/1996 | Thompson et al. |
| 5,496,532 A | 3/1996 | Monzen et al. |
| 5,500,202 A | 3/1996 | Germain et al. |
| 5,505,921 A | 4/1996 | Luckoff et al. |

(Continued)

FOREIGN PATENT DOCUMENTS

EP 0864362 9/1998

(Continued)

OTHER PUBLICATIONS

J. R. Rostrup-Nielsen et al., "$CO_2$ Reforming of Methane Over Transition Metals", *Journal of Catalysis* 144, pp. 38-49 (1993), no month.

(Continued)

Primary Examiner—Wayne A. Langel
(74) Attorney, Agent, or Firm—Workman Nydegger

(57) ABSTRACT

A process is disclosed for the direct catalytic production of aqueous solutions of hydrogen peroxide from hydrogen and oxygen in the presence of a small amount of one or more water soluble organic additives (about 0.1–10% by weight). Suitable catalysts include nanometer-sized noble metal catalytic crystal particles. The catalyst particles preferably have a controlled surface coordination number of 2 to increase the selectivity of hydrogen peroxide production. The water soluble additive(s) increases catalytic activity causing significant increases in the apparent first order reaction rate constant for the direct production of aqueous hydrogen peroxide.

30 Claims, No Drawings

U.S. PATENT DOCUMENTS

| | | |
|---|---|---|
| 5,583,085 A | 12/1996 | Ward |
| 5,698,488 A | 12/1997 | Birbara et al. |
| 5,767,036 A | 6/1998 | Freund et al. |
| 5,846,895 A | 12/1998 | Gila et al. |
| 5,851,948 A | 12/1998 | Chuang et al. |
| 5,859,265 A | 1/1999 | Muller et al. |
| 5,900,386 A | 5/1999 | Freund et al. |
| 5,912,367 A | 6/1999 | Chang |
| 5,961,948 A | 10/1999 | Wanngard |
| 5,965,101 A | 10/1999 | Goto et al. |
| 5,972,305 A | 10/1999 | Park et al. |
| 5,976,486 A | 11/1999 | Thompson et al. |
| 6,005,155 A | 12/1999 | Sun |
| 6,054,507 A | 4/2000 | Funaki et al. |
| 6,090,858 A | 7/2000 | El-Sayed |
| 6,106,797 A | 8/2000 | Muller et al. |
| 6,117,409 A | 9/2000 | Bertsch-Frank et al. |
| 6,127,307 A | 10/2000 | Muller et al. |
| 6,159,267 A | 12/2000 | Hampden-Smith et al. |
| 6,168,775 B1 | 1/2001 | Zhou et al. |
| 6,194,338 B1 | 2/2001 | Andolfatto et al. |
| 6,210,651 B1 | 4/2001 | Nystrom et al. |
| 6,239,054 B1 | 5/2001 | Shukis et al. |
| 6,284,213 B1 | 9/2001 | Paparatto et al. |
| 6,299,852 B1 | 10/2001 | Nystrom et al. |
| 6,307,073 B1 | 10/2001 | Jones |
| 6,331,500 B1 | 12/2001 | Tsuji et al. |
| 6,375,920 B1 | 4/2002 | Fischer et al. |
| 6,387,346 B1 | 5/2002 | Bertsch-Frank et al. |
| 6,444,712 B1 | 9/2002 | Janda |
| 6,447,743 B1 | 9/2002 | Devic et al. |
| 6,468,496 B1 | 10/2002 | Jones et al. |
| 6,500,968 B1 | 12/2002 | Zhou et al. |
| 6,500,969 B1 | 12/2002 | Zhou et al. |
| 6,504,040 B1 | 1/2003 | Vogtel et al. |
| 6,518,217 B1 | 2/2003 | Xing et al. |
| 6,528,683 B1 | 3/2003 | Heidemann et al. |
| 6,534,440 B1 | 3/2003 | Choudhary et al. |
| 6,534,661 B1 | 3/2003 | Zhou et al. |
| 6,551,960 B1 | 4/2003 | Laine et al. |
| 6,576,214 B1 * | 6/2003 | Zhou et al. ............ 423/584 |
| 6,630,118 B1 | 10/2003 | Paparatto et al. |
| 6,635,348 B1 | 10/2003 | Hampden-Smith et al. |
| 6,649,140 B1 | 11/2003 | Paparatto et al. |
| 6,676,919 B1 | 1/2004 | Fischer et al. |
| 6,713,036 B1 | 3/2004 | Vanden Bussche et al. |
| 6,740,615 B1 | 5/2004 | Zhou |
| 6,746,597 B1 | 6/2004 | Zhou et al. |
| 6,764,671 B1 | 7/2004 | Haas et al. |
| 6,768,013 B1 | 7/2004 | Pujado |
| 6,872,377 B1 | 3/2005 | Fischer et al. |
| 6,888,013 B1 | 5/2005 | Paparrato et al. |
| 2001/0024634 A1 | 9/2001 | Bertsch-Frank et al. |
| 2001/0051662 A1 | 12/2001 | Beer |
| 2002/0006968 A1 | 1/2002 | Abbott |
| 2002/0028164 A1 | 3/2002 | Schutte et al. |
| 2003/0086853 A1 | 5/2003 | Devic |
| 2003/0180212 A1 | 9/2003 | Huckins |
| 2003/0215383 A1 | 11/2003 | Escrig et al. |
| 2004/0013601 A1 | 1/2004 | Butz et al. |
| 2004/0037769 A1 | 2/2004 | Paparatto et al. |
| 2004/0037770 A1 | 2/2004 | Fischer et al. |
| 2004/0081611 A1 | 4/2004 | Muller et al. |
| 2004/0126312 A1 * | 7/2004 | Butz et al. ............ 423/584 |
| 2004/0151659 A1 | 8/2004 | Paparatto et al. |
| 2004/0151660 A1 | 8/2004 | Paparatto et al. |
| 2004/0184983 A1 | 9/2004 | Paparatto et al. |

FOREIGN PATENT DOCUMENTS

| | | |
|---|---|---|
| EP | 0 978 316 | 2/2000 |
| EP | 1 160 195 | 12/2001 |
| EP | 1 160 196 | 12/2001 |
| EP | 1 277 701 | 7/2002 |
| EP | 1 308 416 | 5/2003 |
| EP | 1 344 747 | 9/2003 |
| GB | 1056123 | 1/1967 |
| GB | 1056125 | 1/1967 |
| GB | 1056126 | 1/1967 |
| GB | 1094804 | 12/1967 |
| JP | 05017106 | 1/1993 |
| JP | 07033410 | 2/1995 |
| JP | 07069604 | 3/1995 |
| JP | 07069605 | 3/1995 |
| JP | 07241473 | 9/1995 |
| JP | 09241009 | 9/1997 |
| JP | 09301705 | 11/1997 |
| JP | 10324507 | 12/1998 |
| JP | 10330103 | 12/1998 |
| JP | 11060213 | 3/1999 |
| JP | 11139812 | 5/1999 |
| JP | 2003010693 | 1/2003 |
| JP | 2003024794 | 1/2003 |
| WO | WO 97/32811 | 9/1997 |
| WO | WO 97/32812 | 9/1997 |
| WO | WO 98/10863 | 3/1998 |
| WO | WO 00/58242 A | 10/2000 |
| WO | WO 00/59635 | 10/2000 |
| WO | WO 01/05498 | 1/2001 |
| WO | WO 01/05501 | 1/2001 |
| WO | WO 02/14217 | 2/2002 |
| WO | WO 02/14299 | 2/2002 |
| WO | WO 02/28527 | 4/2002 |
| WO | WO 02/28528 | 4/2002 |
| WO | WO 02/83550 | 10/2002 |
| WO | WO 02/92501 | 11/2002 |
| WO | WO 02/92502 | 11/2002 |
| WO | WO 03/14014 | 2/2003 |
| WO | WO 04078740 | 9/2004 |

OTHER PUBLICATIONS

T. S. Christensen, "Adiabatic Prereforming of Hydrocarbons—An Important Step in Syngas Production", *Applied Catalysis A: General* 138, pp. 285-309 (1996), no month.

Zhou, et al., "Novel Synthesis of Highly Active Pt/C Cathode Electrocatalyst for Direct Methanol Fuel Cell" Chem. Commun. 2003, pp. 394-395, no month.

Zhou, et al. "Preparation and Characterization of Anode Catalysts PtRu/C for Direct Methanol Fuel Cells" Chemical Journal of Chinese Universities, vol. 24, 2003, pp. 885-862, no month.

"Shape-Controlled Synthesis of Colloidal Platinum Nanoparticles" by T. Ahmadi et al, Science, vol. 272, Jun. 28, 1996, pp. 1924-1926.

Li, et al, "Preparation and Characterization of Multiwalled Carbon Nanotube-Supported Platinum for Cathode Catalysts of Direct Methanol Fuel Cells", *J. Phys. Chem*, B, Jun. 6, 2003, vol. 107, pp. 6292-6299.

Li, et al., "Carbon nanotubes as support for cathode catalyst of a direct methanol fuel cell", *Letters to the Editor/Carbon 40* Dalian University of Technology, (2002), pp. 787-803, no month.

Lordi, et al., "Method for Supporting Platinum on Single-Walled Carbon Nanotubes for a Selective hydrogenation Catalyst", *Chem. Mater.* 2001, vol. 13, pp. 733-737, no month.

Zhou et al, "Novel synthesis of highly active Pt/C cathode electrocatalyst for direct methanol fuel cell", *Chem. Commun.*, Jan. 13, 2003, (3), pp. 394-395.

Zhou, et al., "Preparation and Characterization of Anode Catalysts PtRu/C for Direct Methanol Fuel Cells", *Chemical Journal of Chinese Universities*, vol. 24, No. 5, pp. 858-862, no date.

* cited by examiner

PROCESS FOR DIRECT CATALYTIC HYDROGEN PEROXIDE PRODUCTION

CROSS-REFERENCE TO RELATED APPLICATIONS

This application claims priority to and the benefit of U.S. Provisional Patent Application No. 60/491,144, filed on Jul. 29, 2003, entitled, "Additive For Direct Catalytic Hydrogen Peroxide Production," which is incorporated herein by reference in its entirety.

BACKGROUND OF THE INVENTION

1. The Field of the Invention

This invention relates to processes for the direct catalytic production of aqueous solutions of hydrogen peroxide from hydrogen and oxygen. In particular, embodiments of the present invention relate to processes that increase catalytic activity using a relatively small amount of an additive.

2. The Related Technology

Recent demand for hydrogen peroxide product has been growing significantly both globally and in North America. This growth in demand is due primarily to hydrogen peroxide's effectiveness in chemical processes and its environmental advantages. When used in a chemical process, hydrogen peroxide decomposes into oxygen and water, which are environmental friendly byproducts.

These advantages have led many to develop new processes that use hydrogen peroxide and/or to replace certain reagents with hydrogen peroxide. For example, hydrogen peroxide is an effective replacement for chlorine in pulp and paper bleaching, water treatment, and other environmental processes. The use of hydrogen peroxide in these processes has helped meet the increased demand for products from these processes, while providing a safer, more cost effective, and more environmentally friendly manufacturing process.

Currently most commercial hydrogen peroxide is produced at hydrogen peroxide production facilities and then shipped to manufacturers who use the hydrogen peroxide in their processes. Commercially produced hydrogen peroxide is typically made using an indirect anthraquinone process. The indirect process avoids handling hydrogen gas at elevated temperatures and pressures, which can create serious safety concerns.

Nevertheless, the anthraquinone process has its own safety issues and is known to have high capital and operating costs. These safety concerns and high capital costs economically prohibit producing the hydrogen peroxide on-site at the end users facility. Consequently, the hydrogen peroxide is produced in one location and then shipped. Shipping hydrogen peroxide creates additional safety problems since concentrated hydrogen peroxide can be explosive if it violently decomposes.

Many attempts have been made to produce hydrogen peroxide directly from hydrogen and oxygen-containing feedstreams. Direct synthesis of hydrogen peroxide can potentially reduce production cost and avoid the use of toxic feedstock and working solutions (e.g., anthraquinone). Known processes for directly producing hydrogen peroxide require a catalyst and feedstreams of hydrogen and oxygen. Hydrogen and oxygen in the presence of the catalyst forms hydrogen peroxide. This process is very advantageous because it uses environmentally friendly reagents (hydrogen and oxygen) and generates no waste. Furthermore, the simplicity of the direct process makes the direct process appear to be very cost effective.

Although direct catalytic synthesis of hydrogen peroxide has attracted much attention, none of the existing processes have proved to be commercially feasible. These processes typically fail because they either require hazardous operating conditions or have low reaction rates and poor product selectivity.

Before the early 1990s most developmental hydrogen peroxide direct synthesis processes used hydrogen feed gas above 10% hydrogen in air or oxygen. These concentrations are well within the flammability limits for $H_2$ and $O_2$ mixtures. Since air can supply the oxygen for the combustion of $H_2$, using feedstreams of $H_2$ within the flammability limits is extremely dangerous.

Due to safety concerns, the recent approach has been to utilize feedstreams having hydrogen concentration below about 5 vol. %. Feedstreams below about 5% are typically not explosive. However, at such low hydrogen concentration the production rates drop to unacceptably low rates.

To achieve higher rates of production, existing processes have used a supported noble metal catalyst. The noble metal is dispersed on a support, such as carbon, to enhance catalytic activity. However, the dispersion methods used have typically not controlled for selectivity of hydrogen peroxide. Consequently, these processes produce insufficient amounts of hydrogen peroxide.

While it is known that reaction media consisting of organic solvents in significant quantity can enhance the rate of hydrogen peroxide synthesis, albeit at significant risk, the reason for that enhancement is not factually known. One assumption is that the improvement is derived from an increase in the solubility of the reaction gases, especially hydrogen, in the reaction mixture. The greater solubility theoretically allows a greater concentration of dissolved reactants to reach the catalyst surface, thereby increasing the reaction rate. Consequently, the prior art teaches that the efficacious role of organic solvents in hydrogen peroxide production is tied to the use of substantial quantities of organic solvent in the reaction mixture.

However, in many cases, it is desirable to directly produce a hydrogen peroxide product that is nearly free of organic solvents. Many end users of hydrogen peroxide need product that is essentially free from organic solvents to properly perform their manufacturing processes. Thus large quantities of organic solvent must be separated out before the hydrogen peroxide can be used. This separation step is quite costly. This cost creates a conflict between the artisan's desires to enjoy the rate benefits of a substantial amount of an organic solvent in the direct hydrogen peroxide process while at the same time producing an aqueous hydrogen peroxide product without requiring downstream separation.

Therefore what is needed is a process for increasing direct catalytic hydrogen peroxide production while avoiding the avoiding the costs associated with separating out large quantities of organic solvent.

BRIEF SUMMARY OF THE INVENTION

The present invention provides a substantially improved method for producing aqueous solutions of hydrogen peroxide by the direct catalytic synthesis of hydrogen peroxide ($H_2O_2$) from hydrogen ($H_2$) and oxygen ($O_2$) in aqueous solution. In one embodiment, the process of the present invention includes providing a vessel containing an aqueous reaction mixture. The reaction mixture includes a catalyst and about 0.1 to about 10 percent by weight of a water soluble additive.

Oxygen and hydrogen are introduced into the mixture as a gas feedstream. The gas feedstream is introduced into the reaction mixture under reaction conditions sufficient to convert the hydrogen and oxygen to hydrogen peroxide. The catalyst converts the hydrogen and oxygen to aqueous hydrogen peroxide product, which is then recovered from the reaction mixture.

The gas feedstream includes oxygen and up to about 50% by volume of hydrogen. In general, increasing the concentration of hydrogen increases the rate at which hydrogen peroxide is produced. Lowering the concentration of hydrogen decreases the chance for explosion and increases the safety of the reaction process. These differing concerns can be balanced depending on the circumstances. Where it is desirable to increase the rate of hydrogen peroxide production, the concentration of hydrogen in the feedstream is preferably in a range of about 20% to about 50% by volume. Where it is desirable to reduce the danger of explosion, the concentration of hydrogen is preferably in a range of about 1% to about 10% by volume.

The water soluble additives of the present invention comprise low molecular weight, water soluble organic compounds, often characterized as organic solvents, which contain one or more atoms selected from oxygen, nitrogen and/or sulfur (O, N, S). The additive(s), individually or in combination, are selected from classes of organic compounds including aliphatic or aromatic alcohols (primary, secondary or tertiary) and polyols, carbonyl compounds, ethers and carboxylic acids and their derivatives including anhydrides, esters, amides, nitrites and the like.

Preferred additives include one or more of low molecular weight alcohols such as methanol, ethanol, ethylene glycol, propylene glycol and glycerin. However, water soluble polymers such as poly(vinyl pyrrolidone) and polyols such as low molecular weight poly(vinyl alcohol) may also be used as additive.

Catalysts useful in promoting the direct synthesis of hydrogen peroxide from hydrogen and oxygen include noble metals such as platinum, palladium, gold, silver, iridium, osmium, ruthenium, alone or in combination. Noble metal catalysts are typically attached as particles to a support material (e.g., silica, alumina or carbon). Preferred catalysts include supported noble-metal phase-controlled catalyst having a surface coordination number of 2. Phase controlled catalysts can significantly improve the direct synthesis of hydrogen peroxide by improving selectivity. In one embodiment, the noble metal catalyst is a particulate that is insoluble in the aqueous liquid medium.

Catalysts having a surface coordination number of 2 are described in the following copending U.S. applications: Ser. No. 10/618,909, filed Jul. 14, 2003, and entitled "Intermediate Precursor Compositions Used to Make Supported Catalysts Having a Controlled Coordination Structure and Methods for Preparing Such Compositions", and Ser. No. 10/618,808, filed Jul. 14, 2003, and entitled "Supported Catalysts Having A Controlled Coordination Structure And Methods For Preparing Such Catalysts", both of which are incorporated herein in their entirety. Additional features of phase-controlled catalysts suitable for use in the present invention are also disclosed in U.S. Pat. No. 6,168,775, to Bing Zhou et al, which is incorporated herein in its entirety.

The improvements achieved by the process of the invention are characterized by a substantial improvement in the apparent first order reaction rate constant for the reaction of hydrogen and oxygen to hydrogen peroxide. The increase in apparent first order reaction rate constant is manifested by a high yield of hydrogen peroxide product accompanied by high hydrogen conversion. This increase in rate is experienced at both high and low hydrogen feed gas concentrations.

The benefits of the process of the present invention can be particularly useful at low concentrations of additive. Surprisingly, the increase in rate constant is also observed at very low concentrations of additive. Significant increases in rate are observed when the additive is included in the preferred amount of about 0.1% to about 10% by weight of the aqueous solution, more preferably from about 0.1% to about 5% by weight, and most preferably from about 0.5% to about 2% by weight.

One benefit of using very low amounts of additive is that the hydrogen peroxide product is more pure. In many cases the reaction mixture can include the additive in sufficiently low amounts to allow the aqueous hydrogen peroxide product to be used commercially without separating out the additive. For example, the processes of the present invention are very advantageous and cost efficient for on-site production of $H_2O_2$ at pulp and paper plants. The direct production of an aqueous solution of hydrogen peroxide with low concentrations of solvent avoids the costly steps used in the prior art to separate and recover solvent. Furthermore, using less than 5% hydrogen concentration can significantly reduce the hazards of handling hydrogen gas.

Use of the additive in the processes of the present invention is also very advantageous because of its cost effectiveness. In many instances a very cheap additive, such as methanol can be used. Thus, for very little additional expense, the rate of hydrogen peroxide product can be increased.

These and other features of the preset invention will become more fully apparent from the following description and appended claims.

DETAILED DESCRIPTION OF THE PREFERRED EMBODIMENTS

Processes according to the present invention directly produce hydrogen peroxide by catalytic conversion of hydrogen and oxygen in a reactor. The overall reaction composition includes an aqueous solution of hydrogen, oxygen, a catalyst, and a water soluble organic solvent. The water soluble organic solvent is included in small amounts and has a significant positive effect on the rate of hydrogen peroxide production.

I. Definitions

The following conventions are used to describe and claim various aspects of the present invention:

Conversion

The conversion is the percent conversion of the limiting reactant, hydrogen gas. It is expressed as:

$$\text{Conversion} = 100 \times (\text{moles hydrogen consumed})/(\text{moles hydrogen fed})$$

The molar quantities of hydrogen consumed and fed are expressed equivalently in terms of moles per unit time, which is most convenient for a continuous process. Alternatively, the quantity of hydrogen can be expressed in terms of absolute molar amounts, such as in the case of a batch process.

Selectivity

The selectivity is the molar amount of hydrogen peroxide product produced per unit molar amount of hydrogen consumed, expressed as a percentage, as follows:

Selectivity=100×(moles $H_2O_2$ produced)/(moles hydrogen consumed)

Again, the molar quantities of $H_2O_2$ and $H_2$ may be conveniently expressed as either rate quantities or absolute quantities.

Yield

The yield is the molar amount of hydrogen peroxide product produced per unit hydrogen fed, expressed as a percentage, and is equivalent to the product of the conversion and selectivity (corrected to be expressed as a percentage):

Yield=100×(moles $H_2O_2$ produced)/(moles $H_2$ fed)
=Conversion×Selectivity/100

Productivity

The productivity is the amount of hydrogen peroxide product produced per unit catalyst per unit time. A variety of conventions using different units sufficiently describe the productivity of the reaction. The amount of hydrogen peroxide product may be expressed as either a molar or mass quantity. The amount of catalyst may be expressed as the total weight of catalyst, the weight of active component, the surface area of the catalyst, or the volume of the catalyst. Furthermore, any suitable time unit can be used to describe productivity.

For purposes of describing the productivity of the present invention, the convention used is the amount of hydrogen peroxide product expressed in grams, the amount of catalyst expressed in grams of active metal (e.g., palladium), and the time expressed in hours. Thus, Productivity=(grams $H_2O_2$ produced)/((grams Pd/Pt in catalyst)×(hr))

While the foregoing conventions are used to describe the present invention, those skilled in the art will recognize that other conventions can be used without affecting the scope of the invention. Nevertheless, given the possible alternative conventions, it is important that a particular convention be used consistently when comparing results.

II. Reaction Mixture

The reaction mixture is an aqueous solution of a catalyst, a water soluble organic additive, and other components used to facilitate the direct catalytic production of hydrogen peroxide. Hydrogen and oxygen are also part of the reaction mixture, but are typically fed into the mixture via a hydrogen and oxygen feedstream as discussed below. Furthermore, the reaction mixture is typically single phase and aqueous.

A. Catalyst

Any catalyst useful for the direct synthesis of hydrogen peroxide can be used in the processes according to the invention. The catalyst can include one or more components, either as primary active component, promoter, or modifier. Components can include noble metals, base transition metals, rare earth metals, and alkali and alkali earth metals, and non-metals. These constituents, particularly noble metals, can be utilized alone or in combination.

Preferred catalysts comprise noble metal catalysts including palladium and mixtures of palladium and platinum, including supported noble metal catalysts. Most preferred catalysts comprise catalyst compositions based on the catalytic utility of structures exposing a surface layer of metal atoms wherein the top layer metal atoms have a coordination number of two (2). The term "coordination number" as used herein means that each metal atom in the top layer of the crystal structure has nearest neighbor spacing with exactly two other metal atoms in the top layer. Any other metal atoms in the vicinity of a particular surface atom are either spaced at greater than the nearest neighbor spacing or they are not located in the top layer, or both.

The controlled coordination catalyst employed in the most preferred embodiment of the invention can be provided through the use of catalytic crystals or crystallites that predominantly expose one or more of a number of low-index crystal faces of common crystal lattices. The useful crystal faces, which may be used individually or in combination, include but are not limited to the following crystal faces: the (110) face of the FCC lattice, the (221), (331) and (332) crystal faces of the FCC lattice; the (110) crystal face of the HCP lattice; the (101) crystal face of the HCP lattice; the (122) crystal face of the HCP lattice; the (120) crystal face of the HCP lattice; the (122) crystal face of the BCC lattice; and the (123) crystal face of the BCC lattice. In the foregoing crystal face designations, it should be understood that the crystal faces have alternate Miller index designations, each of which are equivalent to the crystal face designations listed above.

For some crystal faces, the different crystal face designations are equivalent. In the FCC and BCC crystal lattices all three coordinate directions are equivalent. For example, the (110) crystal face is identical to the (101) and the (011) faces. For the HCP lattice, only the first two coordinates are equivalent. The (101) and the (011) faces, for example, are identical whereas the (110) face is distinct.

Other beneficial characteristics of the most preferred catalysts include particles that are (a) small, (e.g. less than 5 nm in diameter), (b) uniform in size and distribution, and (c) stable against agglomeration and crystal face reorientation. In one embodiment, the catalyst comprises particles having a size between 0.5 and 100 nm.

B. Water Soluble Organic Additive

The water soluble additives of the present invention are included in the reaction mixture to increase the first order reaction rate constant. Useful additives of the invention include water soluble $C_1-C_{12}$ primary, secondary or tertiary alcohols, $C_2-C_{12}$ diols and polyols, aldehydes, ketones, ethers, carboxylic acids, carboxylic acid anhydrides, esters, amides, carboxylic acid nitriles, and organosulfonic acids.

More particularly, the additives include methanol, ethanol, propanol, isopropanol, butanol, ethylene glycol, propylene glycol, glycerin, polyvinyl alcohol, polyvinyl pyrrolidone formaldehyde, acetaldehyde, acetone, methylethyl ketone, tetrahydrofuran, dioxane, formic acid, acetic acid, propionic acid, oxalic acid, malonic acid, ethyl acetate, acrylic acid, acrylonitrile, dimethylformamide and dimethylsulfoxide.

The additive is included in the reaction mixture in low concentrations. Preferably, the additive is included in amount of about 0.1% about 10% by weight of the aqueous solution, more preferably from about 0.1% to about 5% by weight, and most preferably from about 0.5% to about 2% by weight. A particularly preferred additive is methanol at a concentration in water of about 0.5–2% by weight. The foregoing compounds and weight percentages are examples of means for improving the productivity of hydrogen peroxide product.

C. Feedstream(s)

In an exemplary embodiment, hydrogen and oxygen are included in the reaction mixture through one or more feedstreams. The feedstream is continuously applied to the reaction mixture to form a continuous process.

Hydrogen, which is typically the limiting reagent, can be used in concentrations ranging from about 1% to about 50% by volume of the feedstream. In general, increasing the concentration of hydrogen increases the rate at which hydrogen peroxide is produced. Lowering the concentration of hydrogen decreases the chance for explosion and increases the safety of the reaction process. These differing concerns can be balanced depending on the circumstances.

Where it is desirable to increase the rate of hydrogen peroxide production, the concentration of hydrogen in the feedstream is preferably in a range of about 20% to about 50% by volume. Where it is desirable to reduce the danger of explosion, the concentration of hydrogen is preferably in a range of about 1% to about 10% by volume. In order to balance the two competing concerns, the hydrogen concentration is preferably in a range of about 3% to about 25% by volume.

The feedstream also includes a desired amount of oxygen for converting the hydrogen to hydrogen peroxide. To promote the formation of hydrogen peroxide instead of water, a competing reaction product, the molar ratio of oxygen to hydrogen in the feedstream is preferably at least about the stoichiometric amount required for each mole of hydrogen gas ($H_2$) to be converted into hydrogen peroxide ($H_2O_2$), i.e., at least 1:1.

As discussed above, the explosiveness and flammability of the hydrogen feedstream depends in large part on the concentration of hydrogen in the feedstream. As the concentration of hydrogen is reduced, the explosiveness and flammability of the feedstream is reduced, which provides for a safer working environment. Where it is particularly desirable to reduce the chance of explosion, the hydrogen in the feedstream may be less than 5% by volume. Where more dilute concentrations of hydrogen and oxygen are desired, the feedstream also includes one or more inert gases.

The feedstream is introduced into the reaction mixture under reaction conditions sufficient to convert hydrogen and oxygen to hydrogen peroxide. In an exemplary embodiment, the reaction conditions include temperatures between about 0–100° C. and pressures between about 100–3000 psig. Those skilled in the art will recognize that various known reaction conditions can be used to drive hydrogen peroxide production in the process of the present invention.

D. Other Constituents

Other components or promoters can be included in the reaction mixture as needed. These additional constituents include small amounts of strong mineral acids, such as sulfuric acid and hydrochloric acid. The reaction mixture can also include halide promoters such as sodium bromide, hydrogen bromide, and the like. Those skilled in the art will recognize the various additional constituents and reaction conditions that are known to facilitate hydrogen peroxide production.

III. Kinetics

The benefits created by the process of the present invention are evidenced by the increase in the apparent first order reaction rate constant ($k_{app}$). In general terms, the rate constant is defined by the following equation:

$$r_A = kC_A^a C_B^b,$$

where $r_A$ is the reaction rate of reactant A,
k is the rate constant,
the terms $C_n$ are the concentrations of all components n,
and the exponents a, b, etc. are the orders of the reaction with respect to each component.

In the case where the reaction is irreversible and reactant A is limiting, it can be assumed that the rate is determined solely by the concentration of reactant A. If the dependence on reactant A is first-order, then the rate equation can be simplified to $$r_A = kC_A,$$

where k is now the first-order rate constant for the reaction.

In the case where reactant A is a gaseous component, the equation can be expressed in terms of the partial pressure of component A, as follows:

$$r_A = k_{app} p_A,$$

For the purposes of this invention, $r_A$ is a useful form of the rate equation. In the process of the present invention component A is hydrogen gas, which is the limiting reactant, $r_A$ is the rate of reaction of hydrogen, $p_A$ is the partial pressure of hydrogen, and $k_{app}$ is the apparent first-order rate constant.

As will be evident from an examination of the defining equation, $k_{app}$ is not a unitless number. Thus, clear definition of the choice of units is essential for proper comparison of performance data. For purposes of this description, the following unit conventions have been adopted: rA in units of (gmol $H_2$ consumed)/(g catalyst–hr) and pA in units of atm. Thus, kapp has units of (gmol $H_2$ consumed)/(g catalyst–hr–atm).

The quantity expressed above is the apparent first-order rate constant. It does not necessarily express the actual kinetic rate constant (k) of the catalytic chemical reaction since it expresses the concentration of reactant A in terms of a gas phase partial pressure, whereas the reaction occurs at a liquid-solid interface. Therefore, the equation does not take separate account of mass-transfer effects which often influence the rates of three-phase reactions. Instead, any mass transfer effects are embodied in the apparent rate constant ($k_{app}$). Despite this limitation, the apparent first-order rate constant is a useful and simple tool for comparing performance results.

The benefits typically associated with an increase in the apparent rate constant are present in the results of the process of the present invention. The increase in the first-order reaction rate constant has a positive effect on conversion, yield, and productivity. As discussed above, conversion is the percent conversion of hydrogen gas; selectivity is the molar amount of hydrogen peroxide product produced per unit molar amount of hydrogen consumed; yield is the molar amount of hydrogen peroxide product produced per unit hydrogen fed; and productivity is the amount of hydrogen peroxide product produced per unit catalyst per unit time.

These performance parameters are interrelated with the first-order reaction rate constant. Generally, increases in the first-order reaction rate constant will increase the conversion (i.e., increases the percentage of hydrogen converted). Selectivity, however, is not necessarily dependent on the first-order rate constant. In cases where the selectivity does not change (i.e., does not decrease) with an increase in rate constant, the increases in rate constant typically leads to increases in yield and productivity. As demonstrated by the examples below, the present invention follows this typical trend. The examples below show a statistically insignificant change in selectivity due to a change in the rate constant. Therefore, the process of the present invention, has a positive correlation between improvements in the first-order reaction rate constant and improvements in conversion, yield, and productivity.

IV. Theory

While not intending to be bound by theoretical considerations, it is believed that the unexpected increase in the apparent first order reaction rate constant achieved in the invention is not attributable to a simple hydrogen solubility enhancement due to the presence of the organic solvent. Although other studies have shown good correlations between hydrogen solubility and the rate of enhancement associated with the presence of relatively high concentrations of organic solvent in the reaction mixture, very dilute concentrations of organic solvents as described for the process of the present invention do not provide an appreciable increase in hydrogen solubility in aqueous media. Larger concentrations of organic solvents appear to be required to achieve enhanced hydrogen solubility in the aqueous reaction mixture.

The inventors of the process of the present invention believe that the dilute organic solvent modifies the physical properties of the aqueous mixture by a mechanism other than solubility. It is believed that the size of the dispersed bubbles of the reaction gas are reduced, which improves the rate of mass transfer between the gas and the liquid. The effect may be related to a reduction in the surface tension or viscosity of the reaction medium that first becomes effective at very low additive concentrations of between about 0.1–10 wt %.

Regardless of the foregoing theoretical considerations, it is evident that the addition of small amounts of the additive(s) of the invention to concentrated aqueous reaction mixtures of hydrogen and oxygen in the presence of a catalyst, such as a noble metal catalyst, under conditions sufficient to produce hydrogen peroxide results in a significant increase in the apparent first order reaction rate constant over similar reactions without the additive. Moreover, the magnitude of this increase is much greater than that which could be anticipated from the teachings of the prior art or predicted based on models that inherently assume that the effect achieved by water soluble organic additives is derived from enhanced hydrogen solubility.

V. Examples and Comparative Examples

The following examples show the improvement in the apparent rate constant from adding small amounts of the water soluble additive. Example 1 shows the effect where low concentrations of hydrogen are used and Example 2 shows the effects where the hydrogen concentration is high. In both cases there is a significant improvement in the direct catalytic production of aqueous solutions of hydrogen peroxide. The improvements to the process include an increase in hydrogen conversion and yield of hydrogen peroxide.

In Comparative Examples 1 and 2, no additive according to present invention is added. Examples 1 and 2 show that by adding small amounts of the water soluble the apparent first order rate constant is significantly increased.

Comparative Example 1

In this comparative example, hydrogen peroxide was produced in a continuous reactor. The overall feed gas composition was 3.3 volume % hydrogen, 20 volume % oxygen and 76.7 volume % inert gas. The liquid medium was aqueous containing 1% sulfuric acid and 5 ppm of sodium bromide. Three grams of the noble metal Pd—Pt/C catalyst, as described in U.S. Pat. No. 6,168,775, was used at a pressure of 51 atm (750 psi) and 35° C. At steady state conditions, a product concentration of 0.66 wt % hydrogen peroxide was produced at a hydrogen conversion of 13.6% and a hydrogen peroxide selectivity of 46%, based on hydrogen converted. Based on these results, the apparent first order rate constant was 0.0088 gmol of hydrogen consumed per (g cat–hr–atm).

Example 1

In this example the process was conducted identical to the conditions in Comparative Example 1, except that the aqueous mixture also contained 2 wt % methanol. At steady state conditions, the product concentration was 1.25 wt % hydrogen peroxide with a hydrogen conversion of 20.1% and a hydrogen peroxide selectivity of 56% based on hydrogen converted. From these results, the apparent first order reaction rate constant was 0.014 gmol hydrogen per (g cat–hr–atm).

As compared with Comparative Example 1, Example 1 shows that there is a significant increase in hydrogen conversion and product hydrogen peroxide concentration with the use of a dilute concentration organic additive in the reaction media when the gas feed contains a relatively low concentration of hydrogen ($H_2$). Normalizing the $k_{app}$ result by setting the pure aqueous result (Comparative Example 1) to a value of 1 produces a result of 1.6 for Example 1 with 2% methanol.

Comparative Example 2

In this comparative example, hydrogen peroxide was produced in a continuous reactor. The overall feed gas composition was 50% hydrogen and 50% oxygen. The reactor pressure was 34 atm. The reaction mixture was water, with 1% $H_2SO_4$ and 5 ppm NaBr. The reactor contained 0.75 g of Pd—Pt/C catalyst prepared according to U.S. Pat. No. 6,168,775. At steady state conditions, a product concentration of 1.6 wt % $H_2O_2$ was produced at a hydrogen conversion of 33% and a hydrogen peroxide selectivity of 65% based on hydrogen converted. Based on these results, the apparent first-order rate constant was 0.0052 gmol $H_2$/(g cat–hr–atm).

Example 2

This example was conducted under identical conditions to Comparative Example 3, except that the reaction mixture included 2 wt % methanol, and the catalyst was included in an amount of 0.67 g. At steady state conditions, the product concentration was 2.3 wt % $H_2O_2$, with a hydrogen conversion of 60% and a hydrogen peroxide selectivity of 60% based on hydrogen converted. Based on these results, the apparent first-order rate constant is 0.0113 gmol $H_2$/(g cat–hr–atm).

Example 2 compared with Comparative Example 2 shows that there is a significant increase in hydrogen conversion and product hydrogen peroxide concentration with the use of a dilute concentration of water soluble additive when the gas feed contains a relatively high concentration of hydrogen. Normalizing the kapp result by setting the pure aqueous result (Comparative Example 2) to a value of 1 produces a result of 2.2 for Example 2, which contains 2% methanol.

Results

The results expressed in terms of normalized apparent first-order rate constant are summarized in the following table:

|  | Comparative Example 1 | Example 1 | Comparative Example 2 | Example 2 |
|---|---|---|---|---|
| Hydrogen Feed | Dilute (3.3%) | Dilute (3.3%) | Concentrated (50%) | Concentrated (50%) |
| Liquid Feed | Aqueous | Aqueous w/2% methanol | Aqueous | Aqueous w/2% methanol |
| Normalized $k_{app}$ | 1 | 1.6 | 1 | 2.2 |

(Aqueous = 1)

From these results, it is evident that the addition of even small amounts of water soluble additives, such as methanol, to the aqueous reaction media increases the apparent first order reaction rate constant ($k_{app}$) for the process reaction. The additives of the present invention increased the direct catalytic production of hydrogen peroxide from dilute or concentrated feedstreams of hydrogen gas by 40 percent. The improved rate constant is made manifest by improved process parameters including conversion, selectivity and productivity.

What is claimed is:

1. A method for substantially increasing the rate of hydrogen peroxide production during direct catalytic production of hydrogen peroxide from hydrogen and oxygen while also yielding a highly aqueous hydrogen peroxide product, comprising:
   providing a vessel containing an aqueous reaction mixture comprising water, a catalyst, and about 0.1% to about 2% by weight of a water soluble organic additive, wherein the water soluble organic additive is included in an amount so as to not appreciably increase solubility of hydrogen in the aqueous reaction mixture compared to solubility of hydrogen in water alone;
   introducing a gas feedstream into the reaction mixture, the gas feedstream comprising oxygen and up to about 50% by volume of hydrogen, the gas feedstream being introduced into the reaction mixture under reaction conditions sufficient to convert the hydrogen and oxygen to hydrogen peroxide; and
   recovering the highly aqueous hydrogen peroxide product.

2. A method as recited in claim 1, wherein the gas feedstream comprises hydrogen having a concentration in a range of about 20% to about 50% by volume.

3. A method as recited in claim 1, wherein the gas feedstream comprises hydrogen having a concentration in a range of about 1% to about 10% by volume.

4. A method as recited in claim 1, wherein the gas feedstream comprises hydrogen having a concentration in a range of about 3% to about 25% by volume.

5. A method as recited in claim 1, wherein the concentration of the water soluble organic additive is in a range of 0.5% to 2% by weight.

6. A method as recited in claim 1, wherein the gas feedstream is continuously introduced into the reaction mixture to form a continuous hydrogen peroxide production process.

7. A method as recited in claim 1, wherein providing the water soluble organic additive improves the yield of hydrogen peroxide by at least 20% by weight and improves the hydrogen conversion by at least 50%, as compared with the same process without the water soluble organic additive.

8. A method as recited in claim 1, wherein the water soluble organic additive comprises at least one member selected from the group consisting of water soluble $C_1$–$C_{12}$ alcohols, water soluble $C_1$–$C_{12}$ diols, aldehydes, ketones, ethers, carboxylic acids, carboxylic acid amides, carboxylic acid nitriles, and organosulfonic acids.

9. A method as recited in claim 1, wherein the catalyst comprises catalyst particles selected from the group consisting of palladium, platinum, iridium, gold, osmium, ruthenium, rhodium, rhenium, and combinations thereof.

10. A method as recited in claim 9, wherein the catalyst particles have an exposed crystal face atomic surface structure in which at least the top layer of catalyst atoms exhibit a coordination number of 2, wherein the nearest neighbors of each of the top layer of catalyst atoms are two other top-layer atoms also having a coordination number of 2.

11. A method as recited in claim 1, wherein the water soluble organic additive comprises at least one member selected from the group consisting of methanol, ethanol, propanol, isopropanol, butanol, ethylene glycol, propylene glycol, formaldehyde, acetaldehyde, acetone, methyl ethyl ketone, tetrahydrofuran, dioxane, formic acid, acetic acid, propionic acid, oxalic acid, malonic acid, acrylic acid, acrylonitrile, dimethyl formamide, and dimethyl sulfoxide.

12. A method as recited in claim 1, wherein the catalyst comprises catalyst particles having a crystal face, the structure of the crystal face being selected from the group consisting of the (110), (221), (331) and (332) crystal faces of the face centered cubic structure, and the (110), (101), (120), and (122) crystal faces of the hexagonal close packed lattice, and combinations thereof.

13. A method as recited in claim 1, wherein the catalyst comprises catalyst particles having a size in a range of about 0.5 nm to about 100 nm.

14. A method as recited in claim 1, wherein the catalyst comprises catalyst particles deposited on a solid support material.

15. A method as recited in claim 1, wherein the reaction mixture further comprises a mineral acid.

16. A method as recited in claim 1, wherein the reaction mixture further comprises a halide promoter.

17. A method as recited in claim 16, wherein the halide promoter comprises sodium bromide.

18. A method as recited in claim 1, wherein the reaction conditions comprise a temperature of 0–100° C. and a pressure of 100–3000 psig.

19. A method for substantially increasing the rate of hydrogen peroxide production during direct catalytic production of hydrogen peroxide from hydrogen and oxygen while also yielding a highly aqueous hydrogen peroxide product, comprising:
   providing a vessel containing an aqueous reaction mixture of water, a catalyst, and 0.1% to 5% by weight of a water soluble organic additive comprising at least one member selected from the group consisting of methanol, ethanol, propanol, isopropanol, butanol, ethylene glycol, propylene glycol, formaldehyde, acetaldehyde, acetone, methyl ethyl ketone, tetrahydrofuran, dioxane, formic acid, acetic acid, propionic acid, oxalic acid, malonic acid, acrylic acid, acrylonitrile, dimethyl formamide, and dimethyl sulfoxide;
   introducing a gas feedstream into the reaction mixture, the gas feedstream comprising oxygen and up to about 50% by volume of hydrogen, the gas feedstream being introduced into the reaction mixture under reaction conditions sufficient to convert the hydrogen and oxygen to hydrogen peroxide; and recovering the highly aqueous hydrogen peroxide product, wherein the apparent first order reaction rate constant for the production of hydrogen peroxide is at least 40% greater than the apparent first order reaction rate constant achieved when the process is carried out in the absence of the water soluble organic additive even though the water soluble organic additive is included in an amount so as to not appreciably increase solubility of hydrogen in the aqueous reaction mixture compared to solubility of hydrogen in water alone.

20. A method as recited in claim 19, wherein the feedstream comprises hydrogen having a concentration in a range of about 20% to about 50% by volume of the feedstream.

21. A method as recited in claim 19, wherein the feedstream comprises hydrogen having a concentration in a range of about 1% to about 10% by volume of the feedstream.

22. A method as recited in claim 19, wherein the catalyst comprises particles of a noble metal that exhibit an exposed crystal face atomic surface structure in which at least the top layer of catalyst atoms exhibit a coordination number of 2, wherein the nearest neighbors of each of the top layer of catalyst atoms are two other top-layer atoms also having a coordination number of 2.

23. A method for substantially increasing the rate of hydrogen peroxide production during direct catalytic production of hydrogen peroxide from hydrogen and oxygen while also yielding a highly aqueous hydrogen peroxide product, comprising:

providing a vessel containing an aqueous reaction mixture of water, a catalyst and about 0.5% to about 2% by weight of a water soluble organic additive, the water soluble organic additive being selected from the group consisting of water soluble $C_1$–$C_{12}$ alcohols and diols, aldehydes, ketones, ethers, carboxylic acids, organosulfonic acids, and combinations thereof, wherein the water soluble organic additive is included in an amount so as to not appreciably increase solubility of hydrogen in the aqueous reaction mixture compared to solubility of hydrogen in water alone;

introducing a gas feedstream into the reaction mixture, the gas feedstream comprising hydrogen and oxygen, the gas feedstream being introduced into the reaction mixture under reaction conditions sufficient to convert the gas feedstream into hydrogen peroxide; and recovering the highly aqueous hydrogen peroxide product.

24. A method as recited in claim 23, wherein the water soluble organic additive comprises at least one member selected from the group consisting of ethanol, propanol, isopropanol, butanol, ethylene glycol, propylene glycol, formaldehyde, acetaldehyde, acetone, methyl ethyl ketone, tetrahydrofuran, dioxane, formic acid, acetic acid, propionic acid, oxalic acid, malonic acid, acrylic acid, and dimethyl sulfoxide.

25. A method as recited in claim 23, wherein the water soluble organic additive consists essentially of methanol.

26. A method as recited in claim 19, wherein the concentration of the water soluble organic additive is in a range of 0.2% to 5% by weight.

27. A method as recited in claim 23, wherein the feedstream contains between about 1% and about 50% of hydrogen by volume.

28. A method as recited in claim 23, wherein the feedstream contains between about 3% and about 25% hydrogen by volume.

29. A method as recited in claim 23, wherein the catalyst comprises particles of a noble metal that exhibit an exposed crystal face atomic surface structure in which at least the top layer of catalyst atoms exhibit a coordination number of 2, wherein the nearest neighbors of each of the top layer of catalyst atoms are two other top-layer atoms also having a coordination number of 2.

30. A method as recited in claim 23, wherein the concentration of the water soluble organic additive is in a range of 0.5% to 2% by weight.

* * * * *

UNITED STATES PATENT AND TRADEMARK OFFICE
CERTIFICATE OF CORRECTION

| | | |
|---|---|---|
| PATENT NO. | : 7,144,565 B2 | Page 1 of 1 |
| APPLICATION NO. | : 10/897493 | |
| DATED | : December 5, 2006 | |
| INVENTOR(S) | : Rueter et al. | |

It is certified that error appears in the above-identified patent and that said Letters Patent is hereby corrected as shown below:

Column 2
Line 54, remove "avoiding the"

Column 6
Line 56, after "0.1%" insert --to--

Signed and Sealed this

Eighteenth Day of September, 2007

JON W. DUDAS
*Director of the United States Patent and Trademark Office*